APPARATUS FOR RECOGNIZING WAVEFORMS OF VARIABLE TIME DURATION REPRESENTING WAVEFORMS ON A LOGARITHMIC TIME SCALE
Filed Aug. 14, 1963

Inventors:
Clarence L. Coates, Jr.;
Philip M. Lewis, II
by John P. Dellitt
Their Attorney.

United States Patent Office 3,237,112

Patented Feb. 22, 1966

3,237,112

APPARATUS FOR RECOGNIZING WAVEFORMS OF VARIABLE TIME DURATION REPRESENTING WAVEFORMS ON A LOGARITHMIC TIME SCALE

Clarence L. Coates, Jr., Scotia, and Philip M. Lewis II, Schenectady, N.Y., assignors to General Electric Company, a New York corporation Filed Aug. 14, 1963, Ser. No. 302,214
6 Claims. (Cl. 328—139)

This invention relates to apparatus for recognizing unknown signals similar in shape but of varying time duration.

In the copending application of Charles V. Jakowatz, Serial No. 7,276, filed February 8, 1960, now Patent No. 3,114,884, and assigned to the assignee of the present invention, an apparatus is disclosed for recognizing an unknown repetitive signal buried in noise. The signal may, for example, comprise a radar return which is indistinguishable to the human observer. The signal is withdrawn from its background noise by storing a portion of noisy input as a reference, comparing further areas of input therewith until similarity or correlation is indicated, and pursuant to such indication proceeding to alter the stored reference by combining therewith portions of input which give rise to indications of similarity. The stored reference is improved over and over again and storage becomes an increasingly better representation of the unknown signal, while noise fatcors average out because of their incoherent nature.

The adaptive filter is effective in withdrawing a repetitive signal from background noise when each repetition of the signal is essentially identical. There are instances, however, when a desired unknown repetitive signal has the same characteristic shape upon each repetition but is expanded or contracted on a time scale. For example, in speech recognition, electrical signals representing a particular vowel sound have a characteristic shape but are frequently expanded or contracted versions of one another. The same holds true for optical recognition of alpha-numeric characters wherein repetitive electrical signals characterize a particular letter, number or portion thereof. The alpha-numeric character represented may be large or small, and in some instances somewhat differently formed, but still the character should be capable of producing a similarly shaped electrical representation. Another similar problem occurs in the case of output signals received from apparatus having a variable speed of operation, or in the instance of signals received from moving objects and therefore subject to a Doppler increase or decrease in wavelength.

It is therefore an object of the present invention to provide improved apparatus for recognizing unknown signals similar in shape but of varying time duration.

In the concurrently filed application of Charles V. Jakowatz, Serial No. 302,150, entitled "A Self Adapting Filter for Waveforms Similar in Shape," and assigned to the assignee of the present invention, an adaptive filter is set forth and claimed, which is generic to the present invention, including electrical delay means acting to provide several separate outputs derived from a common electrical input. Each such output comprises a number of time-spaced elements or samples of electrical input, secured at spaced taps spaced along a delay means. The time spacings for samples comprising different outputs are chosen to be different and this compensates for compression and expansion of the input signals. The various outputs are then compared with the stored version of the unknown signal, and when sufficient correlation is attained, the sampled output most nearly matching the stored version of the unknown signal is combined therewith. The foregoing apparatus is effective for detecting expanded and contracted signals, but employs a separate set of sampling means for each different time interval, and therefore results in a circuit more complex than the original adaptive filter.

It is therefore a purpose of the present invention to provide a somewhat more simplified apparatus for attaining, in combination with the adaptive filter, the recognition of waveforms similar in shape but of varying time duration and preferably an apparatus which may be placed between a conventional adaptive filter and an unknown signal channel.

In accordance with the present invention adaptive circuitry for recognizing unknown signals similar in shape, of varying time duration, employs means representing electrical input on a logarithmic time scale. We have discovered logarithmic sampling tends to reduce the number of sampling means required. Consecutive outputs from the logarithmic sampling means are summed or coupled together for application to an adaptive filter. Each waveform input to the circuitry in accordance with the present invention results in a time series of replicas of the waveform (plotted on a logarithm time scale) with each replica being smaller or larger than the preceding one. For differently expanded versions of the waveform, different replicas will be of correct size to be recognized by the adaptive filter.

In our concurrently filed application, Serial No. 302,212, entitled "Apparatus for Recognizing Waveforms of Variable Time Duration" and also assigned to the assignee of the present invention, we have set forth and claimed adaptive circuitry wherein the frequency spectrum of the electrical input is portrayed and periodically scanned for determination of recurring signals. While this frequency domain approach has the advantage of simplicity, phase information tends to be lost in the frequency-filtering of electrical input in combination with the subsequent detection thereof.

The subject matter which we regard as our invention is particularly pointed out and distinctly claimed in the concluding portion of this specification. The invention, however, both as to organization and method of operation, together with further objects and advantages thereof, may best be understood by reference to the following description taken in connection with accompanying drawings wherein like reference characters refer to like elements and in which:

Figure 1:
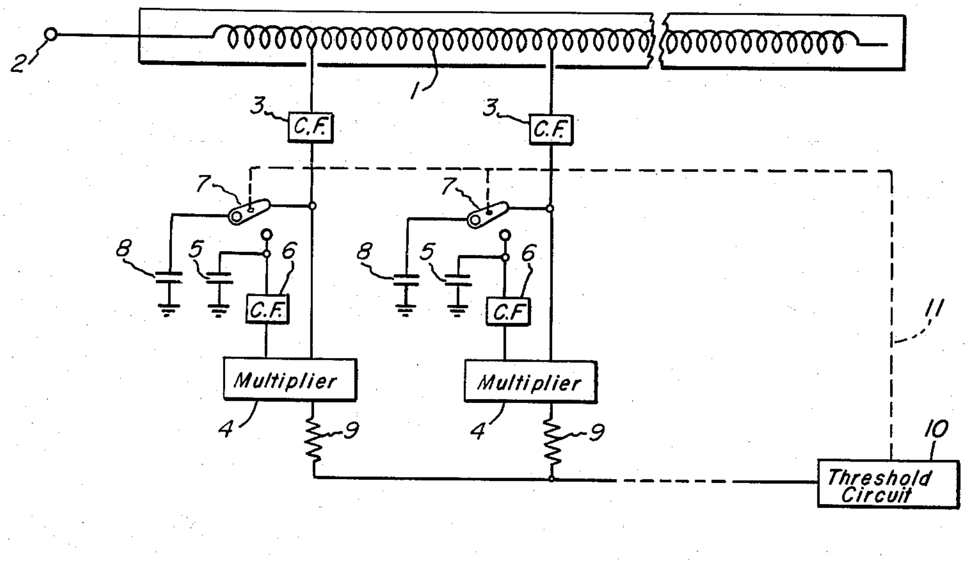
FIG. 1 is a simplified schematic diagram of the prior adaptive filter.

Referring to FIG. 1, an adaptive filter of the type disclosed and claimed in the aforementioned application, Serial No. 7,276, includes a delay line 1, coupled to a source of electrical input at terminal 2. Cathode follower sampling means 3 tapped at spaced points along the delay line each provides an input for one of the multipliers 4 while the remaining input to each multiplier 4 is derived from a storage capacitor 5 through cathode follower 6. The outputs of multipliers 4 are summed through a summing network consisting of resistors 9 and applied as the input to a threshold circuit 10 arranged to actuate contacts 7, as indicated by dashed line 11, when the sum of the multiplications reaches a predetermined value. Single pole, double throw contacts 7 normally connect a sampling capacitor 8 to receive a delay line sample through cathode follower sampling means 3 in the normal switching position, and act to connect a sampling capacitor 8 directly across a storage capacitor 5 in the activated switching position.

As specifically disclosed in the aforementioned application, the sum applied to the threshold circuit 10 approximates the cross correlation function between the elements of electrical input distributed along delay line 1 and corresponding stored signal elements on storage capacitors 5. When the cross correlation function reaches a predetermined threshold, a predetermined degree of comparison between the incoming electrical input and stored values has been attained, and therefore threshold circuit 10 acts to close contacts 7 from the upper position to the lower position thereby connecting the respective sampling and storage capacitors 8 and 5 together. The capacitor 8 voltage will approximately equal a sample voltage at the corresponding delay line tap. When the capacitors are connected together for a period of time, a charge equilibrium condition therebetween will be reached such that the stored value of voltage on storage capacitor 5 is influenced by the new sample value on sampling capacitor 8. Sampling capacitor 8 is thereupon reconnected to cathode follower sampling means 3 through a contact 7 to reassume the sample voltage along the delay line. After a number of occurrences of a repetitive signal, a fairly accurate representation thereof will be achieved on storage capacitors 5, even though the signal is initially unknown and somewhat obscured by background noise. A repetitive signal as referred to herein is not necessarily a periodic one.

Initially, since the incoming signal is unknown, the threshold established by threshold circuit 10 is set to be very low; however, as a better and better representation of the signal becomes stored on storage capacitors 5, the threshold level of threshold circuit 10 is raised in response thereto, so it will become increasingly likely that switch contacts 7 are actuated in response to the occurrence of the repetitive signal rather than noise.

Although the storage capacitors 5 store an increasingly valid representation of the input signal, the signal in storage is able to follow slow changes in form and relative time position of an input signal. It can be shown the stored value on a storage capacitor 5 will be more nearly representative of the more recent samples from capacitor 8, due to the interaction of capacitors 5 and 8 when connected together by contacts 7.

The above described filter is effective for recognizing a previously unknown signal buried in noise but the signal most readily recognized is one of the same shape and of the same time duration. In accordance with the present invention, the signal will be recognized as a repetition of another if the two signals are the same except one is a stretched version of the other.

In accordance with the present invention, the input signal is presented to a temporary delay means, e.g. a delay line, having taps equally spaced logarithmically therealong. As the unknown signal traverses the delay line, the input becomes increasingly contracted (or expanded) so that it may match the previously stored version of unknown signal in an adaptive filter.

Figure 2:
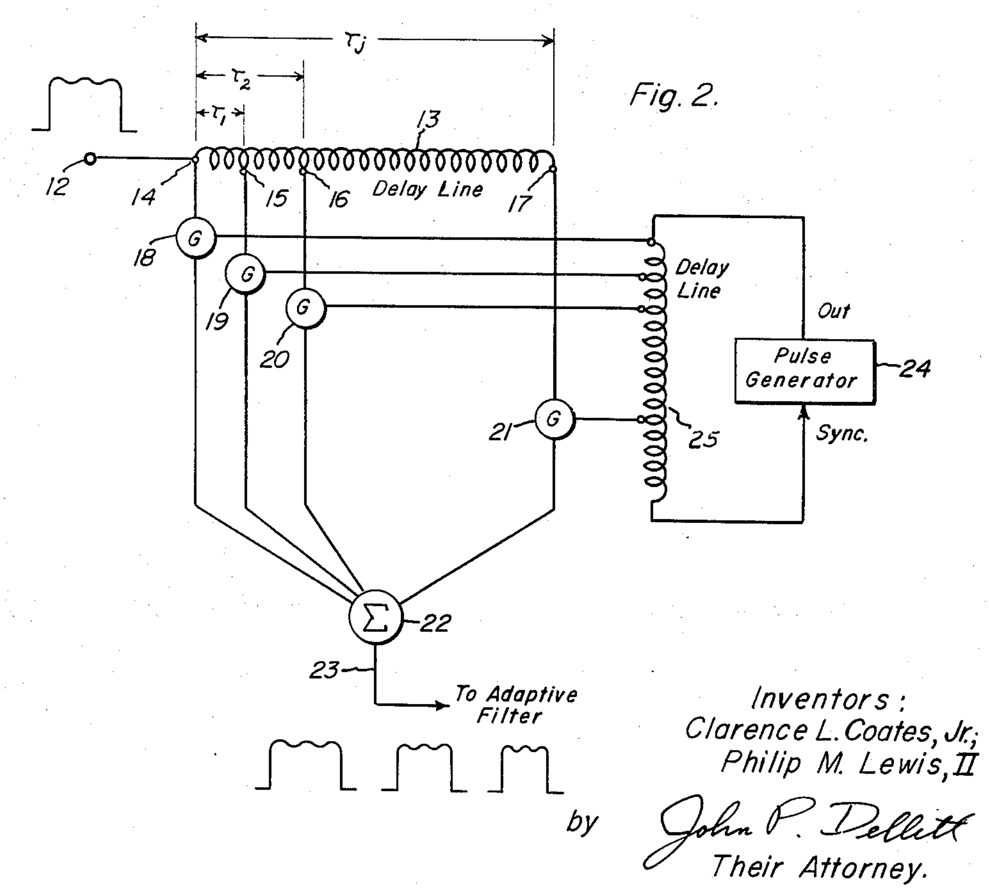
FIG. 2 is a schematic diagram of circuitry in accordance with the present invention for recognizing in combination with the prior adaptive filter unknown signals of varying time duration.

Referring to FIG. 2, electrical input applied to an input terminal 12 is coupled to a delay line 13 provided with taps 14, 15, 16 and 17, spaced therealong. It is understood four taps are shown for illustrative purposes only, and actually a greater number of taps would ordinarily be called for. The taps are spaced such that the first two taps, 14 and 15, are spaced to have a delay $\tau_1$ therebetween; the spacing between taps 14 and 16 is $\tau_2$, and the spacing between tap 14 and the $j^{th}$ tap on the delay line, tap 17, is $\tau_j$. The taps are preferably arranged such that $\tau_j = 2^{j-1}\tau_1$, $j$ equalling 1, 2 . . . $n$, for $n$ equalling more than 3 there has to be at least 3 taps. In other words, the taps are equally spaced on a logarithmic time scale. $\tau$ and $n$ are selected so that $\tau_n$ is long and $\tau_1$ is small compared with the width of the shortest waveform to be recognized.

Referring again to FIG. 2, the taps, spaced consecutively farther apart on a logarithmic scale, are successively and individually sampled by means of gates 18, 19, 20 and 21; the taps are successively connected thereby to a common coupling or summation element 22. The summation element 22 delivers its common output via conductor 23 for connection to terminal 2 of the FIG. 1 adaptive filter.

For the purpose of successively operating gates 18–21 a pulse generator 24 is connected to drive a second delay line 25 having taps spaced uniformly therealong. The gates 18–21 are successively rendered conductive as energized from these taps so that only one gate is conductive at a time. The remaining or end delay line terminal of delay line 25 is conveniently recoupled to provide synchronization for pulse generator 24. Other means for successively energizing gates 18–21 will occur to those skilled in the art. For example, they may be operated by a succession of counters energized from a common oscillator, or other types of switching means may be used. In any case, the taps are sampled consecutively such that the sample rate is high compared to the time it takes a signal waveform to traverse delay line 13. Thus a series of electrical input replica waveforms of varying time duration is presented at input terminal 2 for application to the FIG. 1 adaptive filter. To the adaptive filter, as connected to the FIG. 2 circuit, each replica will appear smaller than the preceding one. It can be seen the sampling rate should be high enough so that several such replicas are presented to the adaptive filter as the input waveform proceeds down delay line 13. For differently expanded versions of the same input waveform, different replicas will be of the correct size to be recognized by a FIG. 1 adaptive filter; depending on various parameters of the device there will be a range in sizes of input waveforms which will be recognized as similar by the filter.

The general operation in accordance with the present invention, proceeds as follows. A reference value of electrical input received by the FIG. 1 adaptive filter from conductor 23 is entered upon storage capacitors 5. Electrical input is then continuously compared with the reference portion of input stored upon storage capacitors 5. Favorable comparison of electrical input with this common storage results in the successfully compared portion of input being combined with the reference in common storage. The repetition of a signal in electrical input will be added to storage even though successive repetitions thereof are somewhat compressed or expanded in time inasmuch as several expanded and contracted replicas of any one signal occurrence are delivered to the FIG. 1 filter, as rapidly sampled by gates 18–21. The successive replicas cover a range in time dimension for the unknown waveform. Therefore stretch or compression in the input signal is compensated for, and one of the input signal replicas should compare successfully with the previously stored version of the unknown signal. The unknown signal is upgraded by the reoccurrence thereof, resulting in an increasingly valid version of unknown signal in storage.

While we have shown and described several embodiments of our invention, it will be apparent to those skilled in the art that many changes and modifications may be made without departing from our invention in its broader aspects; and we therefore intend the appended claims to cover all such changes and modifications as fall within the true spirit and scope of our invention.

What we claim as new and desire to secure by Letters Patent of the United States is:

1. An apparatus for the recognition of signals contained in electrical input comprising means for receiving said input and representing said input logarithmically in successively compressed form in the time dimension, means for comparing successively compressed forms of said input, and means for retaining at least a proportion of said input in response to a favorable comparison thereof.

2. An apparatus for signal recognition comprising electrical input means receiving said electrical input and including delay means representing said input on a logarithmic time scale which is sampled periodically, the sampling rate being high compared to the delay of said delay means, storage means for storing a portion of sampled input as a reference, and means for comparing further sampled input with said reference to ascertain the correlation between sampled input and reference and for combining with said reference in storage quantities proportioned to sampled input comparing favorably with said reference.

3. An apparatus for providing a signal from electrical input to an adaptive filter for the purpose of recognizing waveforms similar in shape comprising sampling means sampling portions of a single electrical input wave, successively at logarithmically related intervals according to the relationship $\tau_j = 2^{j-1}\tau_1$, where $\tau_j$ is the sampling interval, $\tau_1$ is the shortest interval and $j$ equals 1, 2, 3, $n$, and means summing the output from said sampling means for presentation to an adaptive filter, wherein the repetition rate of said sampling is high compared with the time a signal from electrical input is available for sampling.

4. An apparatus for providing an electrical input to an adaptive filter for the purpose of recognizing and adding to storage signals similar in shape comprising a tapped delay line having at least three taps whose taps are equally spaced on a logarithmic time scale, means for consecutively sampling said taps wherein the sampling rate is high compared with the time required for a signal to traverse said delay line so that successive portions of the same input wave are sampled, and coupling means providing the output of said sampling means for presentation to an adaptive filter.

5. The apparatus according to claim 4 further including a second tapped delay line providing outputs at the taps thereof coupled to initiate operation of said sampling means, a pulse generator for periodically driving said second delay line, and means for coupling an output of said delay line for triggering said pulse generator.

6. An apparatus for signal recognition comprising an input terminal, an electrical delay line receiving its input from said input terminal and having a plurality of taps therealong wherein said taps have logarithmic spacing along said delay line, said taps being spaced according to the relationship $\tau_j = 2^{j-1}\tau_1$, where $\tau_j$ is a sampling interval, $\tau_1$ is the shortest sampling interval and $j$ equals 1, 2, 3, $n$, means for repeatedly sampling said taps to provide a sampled signal, means for storing a reference of said sampled signal, means for comparing further portions of said sampled signal with said reference to ascertain the correlation therebetween, and means for combining with said reference signal quantities proportioned to the sampled input comparing favorably with said reference signal.

References Cited by the Examiner

UNITED STATES PATENTS

| | | | |
|---|---|---|---|
| 2,958,039 | 10/1960 | Anderson | 333—29 |
| 3,026,475 | 3/1962 | Applebaum | 324—77 |
| 3,081,434 | 3/1963 | Sandberg | 328—167 X |
| 3,105,197 | 9/1963 | Aiken | 328—151 |
| 3,114,884 | 12/1963 | Jakowatz | 328—139 X |
| 3,120,647 | 2/1964 | Bravenec | 330—70 X |
| 3,133,254 | 5/1964 | Lindsey et al. | 328—165 X |

JOHN W. HUCKERT, *Primary Examiner.*

ARTHUR GAUSS, J. D. CRAIG, *Assistant Examiners.*